United States Patent

[11] 3,624,436

| | | |
|---|---|---|
| [72] | Inventor | Ralph L. Jaeschke<br>Kenosha, Wis. |
| [21] | Appl. No. | 89,329 |
| [22] | Filed | Nov. 13, 1970 |
| [45] | Patented | Nov. 30, 1971 |
| [73] | Assignee | Eaton Yale & Towne Inc.<br>Cleveland, Ohio |

[54] AIR-COOLED ELECTROMAGNETIC BRAKE
5 Claims, 2 Drawing Figs.
[52] U.S. Cl. ................................................. 310/93,
310/96
[51] Int. Cl. ........................................... H02k 49/04
[50] Field of Search ................................................. 310/96,
105, 93, 98

[56] References Cited
UNITED STATES PATENTS
| | | | |
|---|---|---|---|
| 3,566,168 | 2/1971 | Matsubara et al. ........... | 310/105 |
| 2,286,777 | 6/1942 | Winther et al. ............... | 310/95 |

Primary Examiner—D. X. Sliney
Attorney—Teagno & Toddy

ABSTRACT: An air-cooled eddy-current brake utilized to retard and control the velocity of a driven or output shaft. The output shaft is driven by a variable speed coupling whose input or driving member is rotated at a constant velocity by a prime mover such as an AC electric motor. The eddy-current brake is in fluid communication with a fan device driven at a constant speed by the prime mover and thereby receives a substantially constant supply of cooling air regardless of the velocity of the output shaft.

PATENTED NOV 30 1971

3,624,436

INVENTOR.
RALPH L. JAESCHKE

ATTORNEYS.

AIR-COOLED ELECTROMAGNETIC BRAKE

BACKGROUND OF THE INVENTION

1. Field of Invention

This invention relates to an air cooled electromagnetic brake and more particularly to an air cooled electromagnetic brake of the eddy-current type utilized to control the speed of an output shaft of variable or adjustable speed coupling.

2. Description of the Prior Art

Heretofore, air-cooled electromagnetic brakes of the type comprising a stationary member mounted to a housing and a rotatable member mounted to an output shaft utilized cooling fans driven by the rotatable member to provide a flow of cooling air. A serious disadvantage of the prior art construction occurred at low rotational speeds of the output shaft whereat a minimal amount of cooling air was supplied and a great amount of heat was to be dissipated.

Applicant's invention solves this problem by utilizing a fan device driven at a constant speed by a prime mover such as an AC motor; as a result, a substantially constant and maximum volume of cooling air is supplied to the brake for all rotational speeds of the output shaft. This allows a simpler, less expensive air-cooled brake to be used in many applications heretofore requiring a more complicated and more expensive liquid cooled device.

BRIEF SUMMARY OF THE INVENTION

The electromagnetic brake comprises a stationary outer member and a rotatable inner member mounted to a driven or output shaft of a variable speed coupling. The input or driving shaft of the coupling is rotated at a constant speed by a suitable prime mover such as an AC motor. The brake is interposed between an air inlet and a plurality of fin members attached to the input shaft. Thus brake is supplied with a substantially constant volume of cooling air which is drawn in through the air inlet by the constantly rotating fin members regardless of the speed of rotation of the output shaft.

An object of the invention is to provide a new and improved air cooled electromagnetic brake.

A further object of the invention is to provide a new and improved air-cooled electromagnetic brake with a higher breaking capacity than heretofore possible in the prior art.

Other objects and advantages of this invention will be apparent in the following detailed description and in the accompanying drawings.

DETAILED DESCRIPTION OF THE PREFERRED EMBODIMENT

Figures 1, 2:
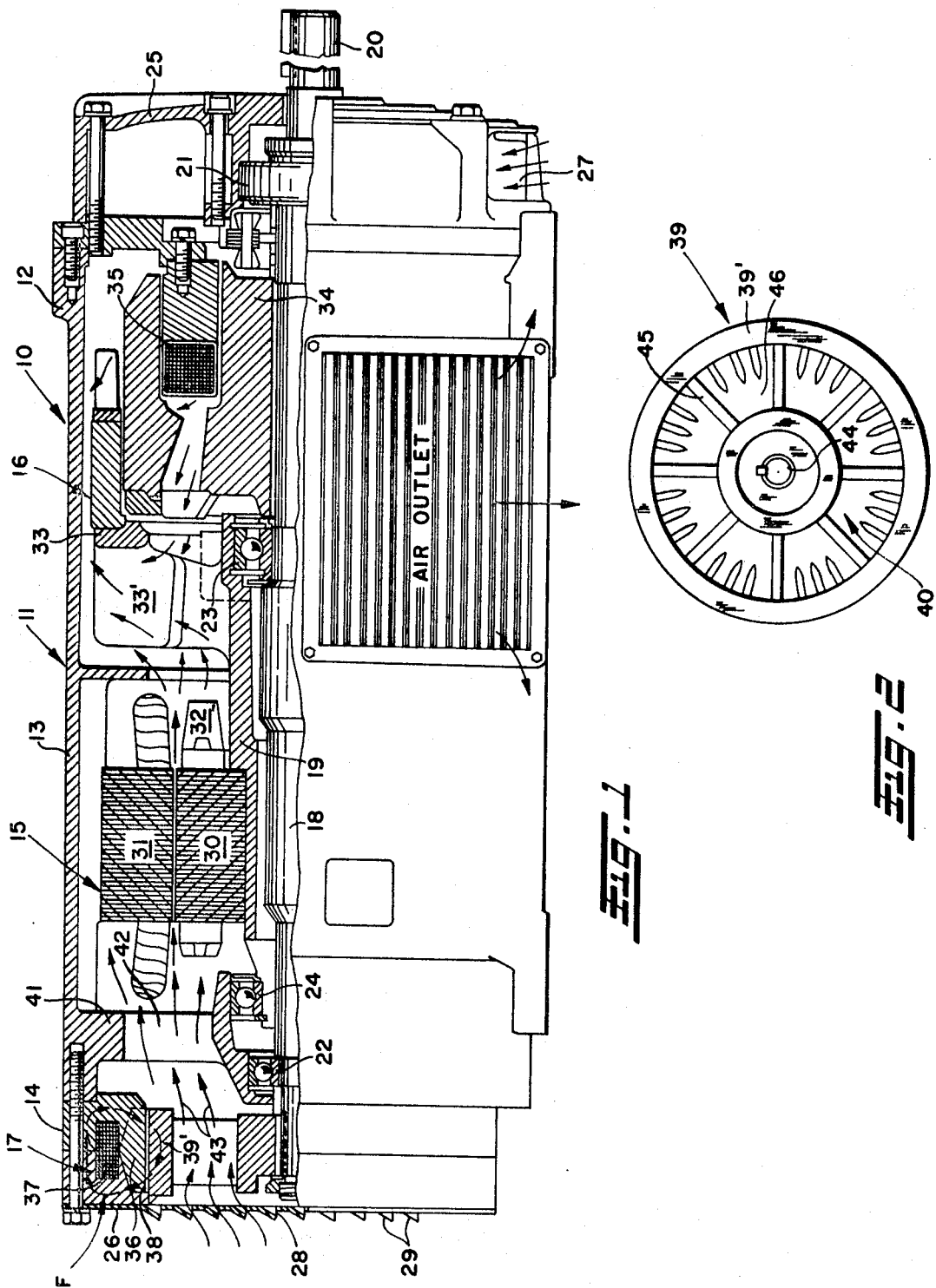
FIG. 1 is a section view of the device.
FIG. 2 is a view showing the pole member.

FIG. 1 discloses an electromagnetic coupling shown generally at 10. The unit has a housing 11 comprising a coupling section 12, a motor section 14 and a brake section 14. The motor section 13 contains a constant speed AC electric motor 15. The coupling section 12 contains an eddy-current clutch 16, however it should be understood that any other type of variable or adjustable speed coupling could be used and the disclosure of an eddy-current coupling is merely for illustrative purposes and not restrictive in anyway. The brake section 14 contains an electromagnetic brake 17 of the eddy-current type.

The unit 10 also comprises coaxial shaft members 18 and 19. Shaft member 18 is the output or driven shaft of the coupling and shaft member 19 is a hollow shaft or quill disposed in a surrounding relationship to the shaft member 18 and forming the rotor shaft of the electric motor 15 and operates as the input or driving shaft member of eddy-current clutch 16. The output shaft 18 has an end portion 20 projecting from the housing 11 and adapted for the connection to a suitable load (not shown).

Shaft 18 is supported for rotational motion within housing 11 by support bearings 21 and 22. An antifriction bearing 23 is mounted on shaft 18 at an intermediate position and supports an inner end portion of shaft 19 while bearing 24 mounted to housing 11 supports the other end of shaft 19.

Housing 11 further comprises end covers 25 and 26 which are provided with air inlets 27 and 28 respectively. It should be noted that air inlets 28 are protected by louvered covers 29.

The electric motor 15 comprises an inner rotor 30 cooperating with stator 31. Stator 31 is suitably mounted in motor section 15 of housing 11 while rotor 30 is secured on shaft 19. The rotor 30 is equipped with a plurality of axially extending air impelling blades or fins 32.

The electromagnetic clutch 16 comprises an outer rotor 33 driven at a constant speed by the AC motor 15 through the input shaft 19 to which it is mounted and the coupling also includes an inner rotor 34 mounted to output shaft 18. Outer rotor 33 carries fans 33'. The coupling further comprises an electrically energizable annular field coil 35. The speed of output shaft 18 may be varied by varying the energization of field coil 35 as is well known in the art and is further described in U.S. Pat. No. 3,012,160, assigned to the assignee of this application.

The electromagnetic brake 17 comprises a stationary annular field member 36 and an electrically energizably stationary annular field coil 37. Field member 36 and field coil 37 are suitably mounted to the brake section 14 of housing 11. Radially spaced across a suitable air gap 38 from field member 36 is inner or inductor member assembly 39. Inner member assembly 39 includes a spider means 40 which extends radially outward from hub 44 and supports inductor 39'. The assembly will be described in greater detail below. The hub 44 is secured to output shaft 18 for rotation therewith.

Field member 36 and inductor member 39 are formed of a suitable ferromagnetic material such as iron.

In operation, a breaking torque is applied to the rotating output shaft 18 by energizing field coil 37 which establishes a magnetic field having a path shown as F. The flux travels from the brake section 14 of housing 11 into field member 36 across air gap 38 into pole member 39 back across air gap 38 into field member 36 and completes a closed loop by returning to brake section 14 of housing 11. The difference in speed between the pole member 39 and field member 36 generates eddy-currents which create a magnetic field which reacts with the field established by the field coil thereby generating a breaking torque on pole member 39' and output shaft 18 to which the pole member is mounted. Varying amounts of breaking torque may be applied to output shaft 18 by varying the degree of energization supplied to field coil 37 as is well known in the art.

As is also well known in the art, the breaking action described above generates a great deal of heat which must be dissipated. The effective capacity of an electromagnetic brake of this type is directly proportional to its ability to dissipate heat. Thus applicant's invention is designed for higher capacities than heretofore possible in prior art air cooled devices by virtue of its inventive air cooling features to be described below.

Frame member 41 of housing 11 which is located between the motor section 13 and the brake section 14 of the coupling is provided with a plurality of apertures 42 providing air communication between the two sections. As mentioned previously, inner rotor 30 of motor 15 carries a plurality of air impelling blades 32.

In operation the air impelling blades 32 and 33' are rotating at a constant speed with the input shaft 19 and thus creates a constant flow of cooling air through air inlets 28, over and around brake 17, through apertures 42 and into motor section 13. This flow of cooling air is designated by the arrows 43, FIG. 1 of the drawing. It may be seen from this description that a constant supply of cooling air is applied to the brake regardless of the speed of output shaft 18. It may further be appreciated that aside from rotating at a constant speed, the input shaft 19 always rotates at a higher speed than output shaft 18 thus providing a maximum of cooling air. This is especially important at low output shaft speeds where prior art devices of the type previously discussed could supply air only at a rate proportional to output shaft speed and were thus very ineffective.

Reference to FIG. 2 will shown spider assembly 40 in greater detail. The assembly comprises a hub member 44 fixedly mounted on output shaft 18. Extending from hub 44 is a plurality of circumferentially spaced apart radially extending spokes 45 with spaces 46 therebetween. Inner rotor or pole member 39 is supported at the outer ends of spokes 45.

This construction is particularly advantageous as it allows for a greater flow between air inlets 28 and apertures 42. It is also advantageous as it provides a large surface area exposed to cooling air for excellent heat dissipation.

Having described my invention, I claim:

1. In a power transmission device comprising a housing,
   a first rotatable shaft mounted within said housing,
   a second rotatable shaft mounted with said housing,
   an AC motor mounted within said housing, said AC motor driving said first shaft at a substantially constant speed,
   a coupling means for driving said second shaft at variable speeds comprising a driving member and a driven member, said driving member secured to said first shaft and rotated therewith, said driven member secured to said second shaft and rotated therewith,
   an electromagnetic brake comprising first and second members, said first member adapted to be secured to said housing, said second member secured to said second shaft and rotatable therewith, a field coil associated with said brake for generating a magnetic field when energized causing a torque to be developed for braking the second shaft, and
   means for cooling said brake comprising fins attached to the rotating member of said AC motor for supplying a substantially constant supply of air to the first and second brake members independent of the speed of the second shaft, said fins communicating with said brake through apertures on a section of said housing separating said motor and said brake.

2. The device of claim 1 wherein said housing has a wall portion separating said brake from said AC motor said wall having apertures therethrough.

3. The device of claim 2 wherein said housing has air inlet apertures therein, said brake interposed said air inlet apertures and said wall portion apertures.

4. A power transmission device comprising:
   A housing with air inlets therein;
   a first rotatable shaft mounted within said housing, said first rotatable shaft driven at a substantially constant speed by an AC motor;
   a second rotatable shaft mounted within said housing;
   a coupling means for driving said second shaft at variable speeds comprising a driving member and a driven member, said driving member secured to said first shaft and rotated therewith, said driven member secured to said second shaft and rotated therewith;
   an electromagnetic brake comprising first and second members, said first member adapted to be secured to said housing, said second member secured to said second shaft and rotatable therewith, a field coil associated with said brake for generating a magnetic field when energized causing a torque to be developed for braking the second shaft;
   a wall portion of said housing separating said brake from said AC motor, said wall portion having apertures therethrough; and
   fins mounted to the rotating member of said AC motor, said brake interposed said air inlets and said wall portion apertures so that said fins will draw cooling air through said air inlets, over said brake and through said wall apertures at a substantially constant rate regardless of the speed of said second shaft.

5. The device of claim 4 wherein said first and second shafts are coaxially aligned, at least one of said shafts being at least partially hollow and surrounding a portion of said other shaft.

* * * * *